United States Patent
Shimanovich

(10) Patent No.: US 7,156,914 B2
(45) Date of Patent: Jan. 2, 2007

(54) PIGMENT PASTE FOR CONCRETE AND METHOD FOR MAKING THE SAME

(75) Inventor: Semyon A. Shimanovich, Brooklyn, NY (US)

(73) Assignee: The Original Concrete Company, LLC, Gardiner, NY (US)

( * ) Notice: Subject to any disclaimer, the term of this patent is extended or adjusted under 35 U.S.C. 154(b) by 0 days.

(21) Appl. No.: 10/877,070

(22) Filed: Jun. 24, 2004

(65) Prior Publication Data

US 2005/0045068 A1 Mar. 3, 2005

Related U.S. Application Data

(60) Provisional application No. 60/482,303, filed on Jun. 24, 2003.

(51) Int. Cl.
| | |
|---|---|
| *C04B 14/00* | (2006.01) |
| *C04B 28/02* | (2006.01) |
| *C04B 40/00* | (2006.01) |
| *C09C 1/36* | (2006.01) |
| *C09D 17/00* | (2006.01) |

(52) U.S. Cl. ............... 106/499; 106/447; 106/453; 106/712

(58) Field of Classification Search ............... 106/499, 106/447, 453, 712
See application file for complete search history.

(56) References Cited

U.S. PATENT DOCUMENTS

| 3,947,398 | A | * | 3/1976 | Williams .................. 524/5 |
|---|---|---|---|---|
| 4,741,781 | A | | 5/1988 | De Witte |
| 5,725,656 | A | | 3/1998 | Shimanovich et al. |
| 5,855,665 | A | * | 1/1999 | Johansen et al. ........... 106/712 |
| 5,951,752 | A | * | 9/1999 | Johansen et al. ........... 106/712 |
| 6,312,513 | B1 | | 11/2001 | Hoefer et al. |
| 6,514,595 | B1 | * | 2/2003 | Sprouts ..................... 428/143 |
| 6,692,565 | B1 | * | 2/2004 | Johansen et al. ........... 106/712 |
| 6,786,965 | B1 | * | 9/2004 | Perry et al. ................. 106/491 |
| 2002/0144632 | A1 | * | 10/2002 | Johansen et al. ........... 106/712 |
| 2004/0226482 | A1 | * | 11/2004 | Johansen et al. ........... 106/712 |
| 2004/0231567 | A1 | * | 11/2004 | Dulzer et al. .............. 106/712 |
| 2005/0014868 | A1 | * | 1/2005 | Rasmusen et al. ........... 524/88 |

FOREIGN PATENT DOCUMENTS

| EP | 0 677 559 A | 10/1995 |
|---|---|---|
| EP | 0 802 242 A2 | 10/1997 |
| WO | WO 01/55050 | 8/2001 |

\* cited by examiner

*Primary Examiner*—Helene Klemanski
(74) *Attorney, Agent, or Firm*—Fish & Neave IP Group Ropes & Gray LLP

(57) ABSTRACT

A pigment paste and a method for making the same that alters the appearance of concrete such that, after the concrete sets, it resembles natural stone concrete sets, it resembles natural stone (e.g., marble, granite, sandstone, bluestone, etc.) without separately applying a finish of any kind to the concrete are provided. The pigment paste preferably comprises a filler, a pigment, an anti-foaming agent, a surfactant, and water. In some embodiments, the surfactant is a water reducing admixture. A concrete compound having a finish resembling natural stone is made by combining the pigment paste with a concrete mix, which includes a cementitious material with aggregate and water, and a chemical admixture. Upon adding the pigment paste and mixing it, the cementitious material is allowed to set, where, after it sets, the concrete has a finish resembling natural stone.

41 Claims, No Drawings

PIGMENT PASTE FOR CONCRETE AND METHOD FOR MAKING THE SAME

CROSS-REFERENCE TO RELATED APPLICATION

This application claims the benefit of Shimanovich U.S. Provisional Patent Application No. 60/482,303, filed Jun. 24, 2003, which is hereby incorporated by reference in its entirety.

BACKGROUND OF THE INVENTION

The present invention relates to a pigment paste for concrete, a method for making the same, and a method for using the pigment paste with concrete. More particularly, the invention relates to a pigment paste that alters the appearance of concrete such that, after the concrete sets, it resembles natural stone. The finished concrete structure may be suitable for the construction of architectural panels, flooring, paving, countertops, tiles, retaining walls, furniture, columns, and sound barriers.

Concrete generally has four components: a cement, a course aggregate of one or more rocks or minerals (e.g., granite, basalt, sandstone, etc.), a fine aggregate of sand, and water. Upon adding water to the cement and aggregate mixture, an exothermic reaction is induced which, after time, hardens the concrete. It is desirable to use concrete because it is the only major building material that can be delivered to a job site in a soft state. This unique quality makes concrete a desirable building material because it can be molded to virtually any form or shape. However, while concrete is a durable and less expensive building material than other materials, such as natural stone (e.g., marble, granite, sandstone, bluestone, etc.), concrete easily stains and is generally considered less attractive.

Alternatively, because granite and marble possess the qualities of versatility coupled with strength and durability, both granite and marble are used for countless applications around the home. Granite is a crystalline, granular rock consisting of colored feldspar, white quartz, mica, and ferromagnesian minerals. These minerals vary in composition and hardness. Marble, although similar in composition, is not as hard as granite. Granite and marble are natural stones each containing a high amount of quartz which has cooled from a molten state inside the earth over a long period of time under immense pressure. Because it is formed naturally, each piece of granite and marble also possess a unique design. Granite is one of the hardest building materials, as demonstrated by the fact that it can only be cut and polished using diamond-tipped machines. However, while marble and granite may be more durable and attractive than concrete, marble and granite are relatively rare, thus making both marble and granite far too expensive to use on a wide-scale basis. Furthermore, marble and granite are hard to work with and cannot be delivered to a job site in a soft state.

It would therefore be desirable to provide a pigment paste and process for making the same that allows concrete to resemble natural stone, such as marble, granite, sandstone, bluestone, etc.

SUMMARY OF THE INVENTION

It is therefore an object of this invention to provide a pigment paste and a method for making the same that allows concrete to resemble natural stone (e.g., marble, granite, sandstone, bluestone, etc.) and to obtain the surface of natural stone without separately applying a finish of any kind to the concrete.

In accordance with this invention, a pigment paste and a method for making the same are provided. The pigment paste preferably comprises a filler, a pigment, an anti-foaming agent, a surfactant, and water. In some embodiments, the surfactant is a water reducing admixture.

The pigment paste for use with cementitious materials may be made using a mixer having a low speed and a high speed. For example, the low speed for the mixer is generally between about 180 RPM and 360 RPM, while high speed is generally between about 380 RPM and 1,700 RPM. Water is added into the mixer.

A surfactant, such as napthalene sulfonate-formaldehyde condensate or any other suitable surfactant for cementitious materials, may be added into the water. When the surfactant is a powder, it is added into the water and the mixer is set at the high speed for a first given time to ensure that the surfactant is dissolved in the water. To ensure that the surfactant is fully dissolved in the water, the mixing time is generally from about five to ten minutes. Alternatively, when the surfactant is a liquid, the surfactant is preferably added into the mixer after blending the dry ingredients with the water.

After setting the mixer at the low speed, a pigment, such as chromium oxide, titanium oxide, or any other suitable pigment for use with cementitious materials, is added to the water and surfactant mixture. It should be noted that the mixing time may depend, for example, on the amount of material being blended and the material itself (e.g., certain pigments absorb more water than other pigments). The filler and anti-foaming agent are added into the mixer, which is set at high speed for a second given time to form the pigment paste. Generally, the mixing time at the low speed is in the range of about 3 minutes to about 10 minutes. Preferably, after 3 minutes of mixing, additional water is added such that the pigment paste has a viscosity of about 1200 SMA to 1500 SMA (similar to cream).

The pigment paste has a shelf life of at least 12 months and may be used with a cementitious material and a chemical admixture to create a concrete product having a finish resembling natural stone. This concrete compound preferably has at least three components: the pigment paste, a chemical admixture, and a concrete mix (i.e., a cementitious material with aggregate and water).

A chemical admixture, such as naphthalene sulfonate-formaldehyde condensate (SNF), melamine-formaldehyde, or any other suitable chemical admixture, is added to the concrete mix in dosage rates of about 0.5% to about 1.2% of cementitious material. The above-mentioned pigment paste is added to the concrete mix with the chemical admixture. Preferably, the amount of pigment paste added is in the range of 0.1% to 10% of cementitious material. However, it should be noted that the amount of pigment paste added may depend, for example, on the desired color. Upon adding the pigment paste to the concrete mix and mixing for about 8 seconds to about 60 seconds, a ready mix is formed. The ready mix is preferably poured into molds and is allowed to set. After setting for about 16 hours to about 24 hours, the concrete may be demolded, where, upon demolding, the concrete has a finish resembling natural stone.

DETAILED DESCRIPTION OF THE INVENTION

In accordance with this invention, a pigment paste for making concrete resemble natural stone (e.g., marble, granite, sandstone, bluestone, etc.) and a method for making the same are provided.

As used herein, the term "natural stone" refers to granite, marble, sandstone, bluestone, or any other natural stone.

The pigment paste preferably comprises a filler, a pigment, an anti-foaming agent, a surfactant, and water.

In one example of a preferred embodiment of the invention, the pigment paste comprises about 682.2 grams of a filler (e.g., white FILLITE 300, grey FILLITE, fly ash, etc.), about 300 grams of a pigment (e.g., chromium oxide, titanium oxide, etc.), about 16 grams of an anti-foaming agent (e.g., FOAMASTER PD-1), about 27.3 grams of a surfactant (e.g., naphthalene sulfonate-formaldehyde condensate, Lomar D, TAMOL, etc.), and about 600 grams of water. This forms a pigment paste having the following ratio: about 42% filler, about 18.4% pigment, about 1% anti-foaming agent, about 1.7% surfactant, and about 36.9% water.

To produce the paste, about 16 grams of the anti-foaming agent are added to a mixing bowl having about 682.2 grams of filler. The mixture of the anti-foaming agent powder and the filler powder may be mixed for several minutes.

Anti-foaming agents may be used to prevent air bubbles from forming. The anti-foaming agent may be, for example, FOAMASTER PD-1 powder or any other suitable anti-foaming agent. FOAMASTER PD-1 is a defoamer and anti-foaming agent manufactured by Cognis Corporation that is typically used with cement and concrete products.

Fillers may be used to increase the shelf life of the pigment paste. For example, when the filler is cement, the pigment paste generally has a shelf life of approximately 2 hours. In another example, when the filler is FILLITE or any other suitable filler, the pigment paste has a shelf life of at least 12 months. Fillers, such as FILLITE, protect the pigment paste from segregation. For example, white FILLITE 300, grey FILLITE, or fly ash may be used as a filler. White FILLITE 300 is a glass-hard, inert, hollow silicate spherical powder that remains uniformly dispersed within the cement. The composition of white FILLITE 300 is as follow:

| Shell (Outer) | $Al_2O_3$ | 27%–33% |
| | $SiO_2$ | 55%–65% |
| | $Fe_2O_3$ | 6% maximum |
| Gas (Inner) | $CO_2$ | 70% |
| | $N_2$ | 30% |

Other exemplary fillers that may be used in accordance with the present invention include grade 300 hollow ceramic microspheres, which are available from Trelleborg Fillite, Inc. (Norcross, Ga.). Fly ash is a silica and alumina residue collected from the chimneys of coal-fired power plants and incinerators.

In a mixer, water is added into the mixing bowl. In one embodiment, 600 grams of water is added into the mixing bowl. The mixer is set at low speed of about 180 RPM to about 360 RPM (i.e., mixers generally have a low speed and a high speed). A surfactant is added to the water. To ensure that the surfactant is fully dissolved in the water, the mixer is set at high speed (e.g., about 380 RPM to 1,700 RPM) for about five to ten minutes to disperse the mixture. The surfactant may be used to improve the distribution of the pigment in the paste and concrete mix. In addition, the surfactant may allow a pigment to disperse uniformly throughout the cement. In some embodiments, the surfactant is a water reducing admixture. Examples of surfactants include napthalene sulfonate-formaldehyde condensate, LOMAR D (a sodium salt of sulfonated naphthaleneformaldehyde condensate manufactured by the Henkel Corporation), TAMOL (a sodium salt of naphthalenesulphonic acid condensation products manufactured by Rohm and Haas Company), or any other suitable surfactant.

The mixer is then set back to low speed (e.g., about 180 RPM to 360 RPM) and a pigment is added to the mixer. Pigments, such as chromium oxide, titanium oxide, or any other suitable pigment for use with cementitious materials, may be used to add color to the resulting concrete. The above-mentioned mixture of the anti-foaming agent powder and the filler powder are also added to the mixer. To ensure that the pigment, the anti-foaming agent, and the filler are fully blended into the mixture, the mixer is set at the high speed (e.g., about 380 RPM to 1,700 RPM) to disperse the mixture until the resulting paste is formed. The mixing time for the mixture is in the range of about 3 minutes to about 10 minutes. Preferably, after 3 to 10 minutes of mixing, additional water is added such that the pigment paste has a viscosity of about 1200 SMA to 1500 SMA (similar to cream).

The pigment paste preferably has a shelf life of at least 12 months.

The pigment paste may be used to form a concrete compound that has a finish resembling natural stone after setting and demolding. The concrete compound preferably has at least three components: the pigment paste, a chemical admixture, and a concrete mix (i.e., a cementitious material with aggregate and water). The process for mixing the pigment paste with the concrete mix and the chemical admixture is as follows.

A chemical admixture, such as naphthalene sulfonate-formaldehyde condensate (SNF), melamine-formaldehyde, or any other suitable chemical admixture, is added to the concrete mix in dosage rates of about 0.5% to about 1.2% of cementitious material. Such chemical admixtures may be used to decrease the ratio of water to cement while increasing flowability and compressive strength. The resulting pigment paste is added to the concrete mix which has the chemical admixture. Preferably, the amount of pigment paste added is in the range of 0.1% to 10% of cementitious material. However, it should be noted that the amount of pigment paste added may depend, for example, on the desired color. It should also be noted that the pigment paste is also advantageous because it significantly reduces the amount of pigment that is generally required to provide color to a cementitious material. Upon adding the pigment paste to the concrete mix and mixing for about 8 seconds to about 60 seconds, a ready mix is formed. The ready mix is preferably poured into molds and is allowed to set for about 16 hours to about 24 hours.

After pouring the ready mix into a mold, the mixture may be consolidated. Consolidation is the process of compacting concrete by molding it and eliminating pockets of entrapped air. Consolidation may be accomplished by hand or by mechanical methods. Vibrators, either internal or external, are generally used for consolidating concrete. When concrete is vibrated with a vibrator, the internal friction between the aggregate particles is temporarily eliminated, thereby causing entrapped air within the concrete to rise to the surface. Examples of vibrators include vibrating tables, vibratory screeds, plate vibrators, vibratory roller screeds, or vibratory hand trowels.

After the mixture of the pigment paste and the concrete mix, which includes the chemical admixture, is allowed to set in the mold, it creates a concrete that has a finish resembling natural stone directly out of the mold without separately applying a finish of any kind to the concrete.

In some embodiments, fibers (e.g., fiber mesh or continuous fibers) may be added to the cementitious material to increase the strength of the material and to prevent cracking of the material. For example, thin panels of concrete (e.g., panels having a thickness of about 0.25 inches) may be formed by adding fibers into the concrete mix. Examples of suitable fibers may include ASR resistant glass fiber, polypropylene fiber, nylon fiber, steel fiber, or any other suitable fiber.

Thus, a pigment paste and method for making the same are provided. Persons skilled in the art will appreciate that the present invention can be practiced by other than the described embodiments, which are presented for purposes of illustration and not of limitation, and that the present invention is limited only by the claims which follow.

What is claimed is:

1. A pigment paste composition for allowing concrete to resemble a natural stone comprising:
   a non-binding filler, the paste characterized by the absence of a binding filler;
   a pigment;
   an anti-foaming agent;
   a surfactant; and water.

2. The composition of claim 1 wherein the filler is an alumino-silicate microsphere.

3. The composition of claim 1 wherein the filler is a grey alumino-silicate microsphere.

4. The composition of claim 1 wherein the filler is a white alumino-silicate microsphere.

5. The composition of claim 1 wherein the filler is fly ash.

6. The composition of claim 1 wherein the pigment is chromium oxide.

7. The composition of claim 1 wherein the pigment is titanium oxide.

8. The composition of claim 1 wherein the anti-foaming agent is in powder form.

9. The composition of claim 1 wherein the surfactant is sodium salt of sulfonated naphthaleneformaldehyde condensate.

10. The composition of claim 1 wherein the surfactant is sodium salt of naphthaleneformaldehyde condensate.

11. The composition of claim 1 wherein the surfactant comprises a sulfonate-formaldehyde condensation product.

12. The composition of claim 1 wherein the surfactant is a water reducing admixture.

13. A pigment paste composition for allowing concrete to resemble a natural stone comprising:
    a non-cementitious filler, the paste characterized by the absence of a cementitious filler;
    a pigment;
    an anti-foaming agent;
    a water reducing admixture; and water.

14. The composition of claim 13 wherein the filler is an alumino-silicate microsphere.

15. The composition of claim 13 wherein the filler is fly ash.

16. The composition of claim 13 wherein the pigment is chromium oxide.

17. The composition of claim 13 wherein the pigment is titanium oxide.

18. The composition of claim 13 wherein the anti-foaming agent is in powder form.

19. The composition of claim 13 wherein the water reducing admixture is sodium salt of sulfonated naphthaleneformaldehyde condensate.

20. The composition of claim 13 wherein the water reducing admixture is sodium salt of naphthalenesulphonic condensate.

21. The composition of claim 13 wherein the water reducing admixture comprises a sulfonate-formaldehyde condensation product.

22. A method for creating a pigment paste for use with cementitious materials using a mixer having a low speed and a high speed, comprising:
    adding water into the mixer;
    adding a surfactant to the water;
    setting the mixer at the high speed for a first given time to ensure that the surfactant is dissolved in the water;
    setting the mixer at the low speed;
    adding a pigment to the water and the surfactant;
    adding a powder mixture to the pigment, the water, and the surfactant, wherein the powder mixture comprises a non-binding filler, the paste characterized by the absence of a binding filler, and an anti-foaming agent; and
    mixing the powder mixture, the pigment, the water, and the surfactant at the high speed for a second given time to form the pigment paste.

23. The method of claim 22 wherein the low speed is between about 180 RPM to about 360 RPM.

24. The method of claim 22 wherein the high speed is between about 380 RPM to about 1,700 RPM.

25. The method of claim 22 wherein the filler is an alumino-silicate microsphere.

26. The method of claim 22 wherein the pigment is chromium oxide.

27. The method of claim 22 wherein the pigment is titanium oxide.

28. The method of claim 22 wherein the anti-foaming agent is in powder form.

29. The method of claim 22 wherein the surfactant is sodium salt of sulfonated naphthaleneformaldehyde condensate.

30. The method of claim 22 wherein the surfactant is sodium salt of naphthalenesulphonic condensate.

31. The method of claim 22 wherein the surfactant comprises a sulfonate-formaldehyde condensation product.

32. The method of claim 22 wherein the surfactant is a water reducing admixture.

33. The method of claim 22 wherein the first given time is between about five minutes and about ten minutes.

34. The method of claim 22 wherein the second given time is between about three minutes and about ten minutes.

35. The method of claim 22 wherein the mixing further comprises mixing the powder mixture, the pigment, the water, and the surfactant until it achieves a viscosity between about 1,200 SMA to about 1,500 SMA.

36. A method for creating a pigment paste for use with cementitious materials using a mixer, comprising:
    adding water into the mixer;
    adding a surfactant to the water;
    dispersing the surfactant in the water;
    adding a pigment to the water and the surfactant;

adding a non-cementitious filler to the pigment, the water, and the surfactant;

adding an anti-foaming agent to the filler, the pigment, the water, and the surfactant; and mixing the anti-foaming agent, the filler, the pigment, the water, and the surfactant to form the pigment paste, the paste characterized by the absence of a cementitious filler.

37. The method of claim 36 wherein the mixing further comprises mixing until the pigment paste achieves a viscosity between about 1,200 SMA to about 1,500 SMA.

38. The method of claim 36 further comprising adding additional water to the anti-foaming agent, the filler, the pigment, the water, and the surfactant.

39. The composition of claim 1 wherein the anti-foaming agent includes a defoamer.

40. The composition of claim 13 wherein the anti-foaming agent includes a defoamer.

41. The method of claim 22 wherein the anti-foaming agent, includes a defoamer.

* * * * *